(12) United States Patent
Ellena et al.

(10) Patent No.: US 8,805,596 B2
(45) Date of Patent: Aug. 12, 2014

(54) REMOTE WIND TURBINE RESET SYSTEM AND METHOD

(75) Inventors: Gregory F. Ellena, Palm Beach Gardens, FL (US); George Quiroga, Boynton Beach, FL (US); Jacques LaFleur, Jupiter, FL (US)

(73) Assignee: Inventus Holdings, LLC, Juno Beach, FL (US)

( * ) Notice: Subject to any disclaimer, the term of this patent is extended or adjusted under 35 U.S.C. 154(b) by 218 days.

(21) Appl. No.: 12/979,752

(22) Filed: Dec. 28, 2010

(65) Prior Publication Data
US 2012/0166000 A1    Jun. 28, 2012

(51) Int. Cl.
*G05D 11/00*    (2006.01)

(52) U.S. Cl.
USPC .......................... 700/287; 702/183; 713/155

(58) Field of Classification Search
USPC ........................... 700/287; 702/183; 713/155
See application file for complete search history.

(56) References Cited

U.S. PATENT DOCUMENTS

| | | | |
|---|---|---|---|
| 6,330,525 B1 * | 12/2001 | Hays et al. | 702/183 |
| 7,318,154 B2 | 1/2008 | Tehee, Jr. | |
| 7,636,615 B2 | 12/2009 | Pfingsten et al. | |
| 2003/0105535 A1 * | 6/2003 | Rammler | 700/17 |
| 2003/0212511 A1 * | 11/2003 | Carle et al. | 702/56 |
| 2007/0063866 A1 | 3/2007 | Webb | |
| 2009/0028184 A1 | 1/2009 | Carpman et al. | |
| 2009/0043415 A1 | 2/2009 | Sun et al. | |
| 2009/0187282 A1 | 7/2009 | Menke et al. | |
| 2009/0254655 A1 | 10/2009 | Kidwell et al. | |
| 2010/0100654 A1 * | 4/2010 | Ramsay | 710/100 |
| 2010/0138182 A1 | 6/2010 | Jammu et al. | |
| 2010/0198429 A1 | 8/2010 | Gizara et al. | |

OTHER PUBLICATIONS

IntegraXor, IntegraXor SCADA/HMI—Product—Leverage on Web 2.0 Flexibilities, Sep. 13, 2010, pp. 1-4, http://www.integraxor.com/product.htm.
Triangle Microworks, Inc., SCADA Data Gateway, Product Data Sheet, Jun. 2010, pp. 1-3.

* cited by examiner

*Primary Examiner* — Mohammad Ali
*Assistant Examiner* — Anthony Whittington
(74) *Attorney, Agent, or Firm* — Feldman Gale, P.A.; Rafael Perez-Pineiro; A. Robert Weaver (57) ABSTRACT

The present invention includes a Computer Assisted Reset (CAR) system that allows a central operations team to remotely reset turbine faults across multiple wind turbine platforms and SCADA systems with a single interface. The system also allows automatic resets to occur. One aspect of the invention includes a Modbus to OPC Translator. The translator permits the implementation of a system where a PLC located at wind turbine control sites can accept control messages or commands organized or formatted in accordance with the Modbus protocol and sent over an Internet Protocol connection, with the translator receiving the requests through the PLC and generating an appropriate OPC ("OLE Process Control") request. The OPC request may then be passed onto a corresponding OPC server residing in the SCADA system for each wind turbine control site.

18 Claims, 5 Drawing Sheets

Turbine Reset Dashboard

Reset Turbines For: [All Sites ▼]  ☐ Auto Tes:  ☐ No Log  [PLC]  [Clear All] [Reset?] [Close]

| Wait | Site | Turbine | Status | Alarm | Fault | Cur/Max | Total | Reset |
|---|---|---|---|---|---|---|---|---|
| ☐ | KMW | A-013 | Faulted | 4/8/2010 4:53:29 PM | (4) Oil Filter Pump Overloaded | 0/1 | 0 | |
| ☐ | SCI | T-079 | Faulted | 4/8/2010 4:53:37 PM | (1119) Timeout Pitch Controller | 0/3 | 0 | ☑ |
| ☐ | BCW | T-020 | Faulted | 4/8/2010 4:53:33 PM | (19379) Successful Battery Test needed | 0/4 | 0 | |
| ☐ | SLW | SA-043 | Faulted | 4/8/2010 4:53:23 PM | (154) Max rotor RPM:__ RPM | 0/1 | 0 | |
| ☐ | SLW | Hw-007 | Faulted | 4/8/2010 4:53:23 PM | (154) Max rotor RPM:__ RPM | 0/2 | 0 | |
| ☐ | MWC | T-007 | Faulted | 4/8/2010 4:53:27 PM | (453) Pitching to run fault | 0/3 | 0 | |
| ☐ | CDW | H-037 | Faulted | 4/8/2010 4:53:30 PM | (19322) Collective Fault Pitch Controller | 0/1 | 0 | |
| ☐ | SLW | Hw-006 | Faulted | 4/8/2010 4:53:23 PM | (154) Max rotor RPM:__ RPM | 0/2 | 0 | ☑ |
| ☐ | HH2 | S-015 | Faulted | 4/8/2010 4:53:31 PM | (13122) Grd. Inv. Communication error | 0/1 | 0 | |
| ☐ | KMW | A-011 | Faulted | 4/8/2010 4:53:29 PM | (4) Oil Filter Pump Overloaded | | | |

Most Recent Log Entries:
4/8/2010 12:59:49 AM
Fault: Timeout Pitch Controller

Reset Instructions:
Check snapshot file under plant status log, determine the original fault, if this is not the trigger fault then refer to original trigger fault for reset procedure. If it is original fault, it may be reset before call out.  Max of 3 Resets Turbine Reset Queue:

| Site | Turbine | Status | Requested | Issued | Ack | Retried | Ready | Tried | SLID |
|---|---|---|---|---|---|---|---|---|---|

[Retry Request] [Cancel Request]

REMOTE WIND TURBINE RESET SYSTEM AND METHOD

BACKGROUND OF THE INVENTION

1. Field of the Invention

The present invention relates to a method for resetting wind turbines. More particularly, the present invention relates to the automatic and remote resetting of wind turbines without manual operator assistance.

2. Description of the Related Art

In order to improve the response time of fleet performance and diagnostic ("FPDC") operators to wind turbine alarm conditions that require a turbine reset, a new method of applying limited remote control is necessary. The current methods require that operators use a remote terminal connection to each site's Supervisory Control and Data Acquisition ("SCADA") system to manually reset turbines. This is a slow, cumbersome process and introduces unnecessary delays due to the time required in maintaining separate remote connections to multiple sites and in dealing with several types of SCADA systems having differing user interfaces.

This invention defines a specification for a new method of remote turbine reset control by utilizing a single interface to communicate with all sites. The purpose of this control interface is to provide an external mechanism to reset wind turbines from a remote location by an operator using a single unified software application, such as a wind alarm monitor. Further, the present invention makes use of programmable logic controllers ("PLC") which are advantageous compared to regular computers in that they are not prone to viral attacks and in that they do not require operating system updates.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention covers a Computer Assisted Reset (CAR) system that allows a central operations team to remotely reset turbine faults across multiple wind turbine platforms and SCADA systems with a single interface. The system also allows automatic resets to occur.

One aspect of the invention includes a Modbus to OPC Translator (the "MOT program"). The MOT program permits the implementation of a system where a PLC located at each wind turbine control site can accept control messages or commands organized or formatted in accordance with the Modbus protocol and sent over an Internet Protocol connection, with the MOT Program receiving the requests through the PLC and generating an appropriate OPC ("OLE Process Control") request. The OPC request is then passed onto the respective OPC server residing in the SCADA system for each wind turbine control site. In a preferred embodiment, Modbus is used for sending control commands because Modbus is easily supported by small, inexpensive PLCs which can be maintained at a fraction of the cost of using PCs, which are normally required to support OPC.

The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DETAILED DESCRIPTION OF ILLUSTRATIVE EMBODIMENTS

SCADA Interface and Data Flow Direction

Figure 1:
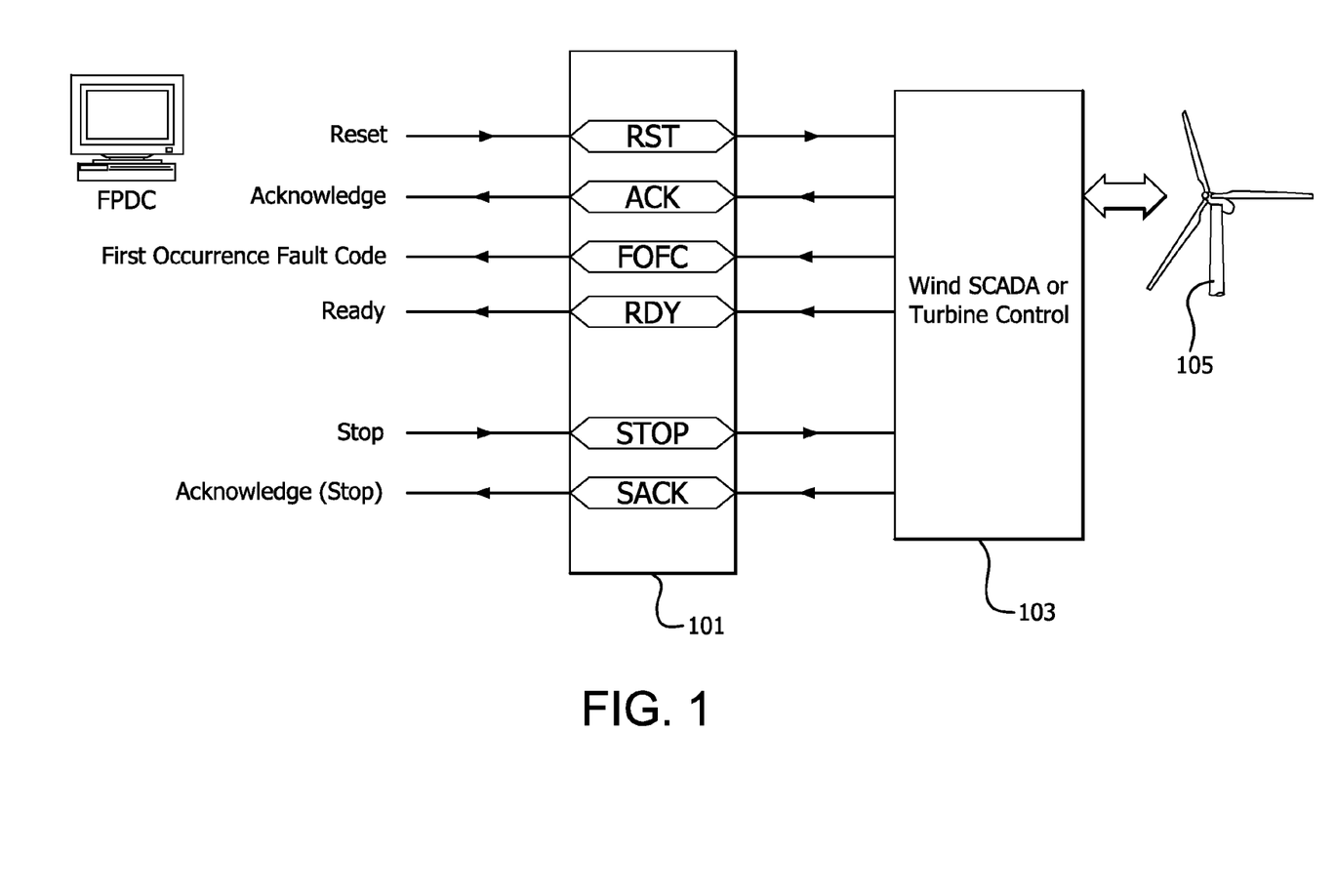
FIG. 1 illustrates a control interface to a SCADA system in accordance with one embodiment of the present invention.

Interface 101 communications via the Object-linking-and-embedding (OLE) for Process Control interface (the OPC specification) use the command structure shown in FIG. 1. The SCADA 103 in turn controls a wind turbine 105, for example.

Control Interface

The control interface 101 of the invention may utilize the signals described in the chart below for the functions indicated. In accordance with one embodiment of the present invention, a communications protocol that is suitable for data transfer is used to transfer the signals.

| Signal | Digital/ Analog | Read/ Write | Description |
|---|---|---|---|
| FOFC | A | R | First Occurrence Fault Code. SCADA 103 sets the initial fault code when RDY is 0 and turbine 105 requires reset |
| RST | D | RW | Reset register set by remote to instruct SCADA 103 to reset. Application clears on ACK or timeout |
| ACK | D | R | Acknowledge to reset. Set by SCADA 103, cleared by SCADA 103 when turbine 105 is ready (RDY = 1) |
| RDY | D | R | Set by SCADA 103 to indicate turbine 105 ready. SCADA 103 also clears ACK and FOFC when this value is 1 |
| STOP | D | RW | Command to stop the turbine 105 (Load Shutdown). Set by remotely. |
| SACK | D | R | STOP signal Acknowledge set by SCADA 103. Cleared by SCADA 103 when turbine 105 is shutdown. |

Figure 2:
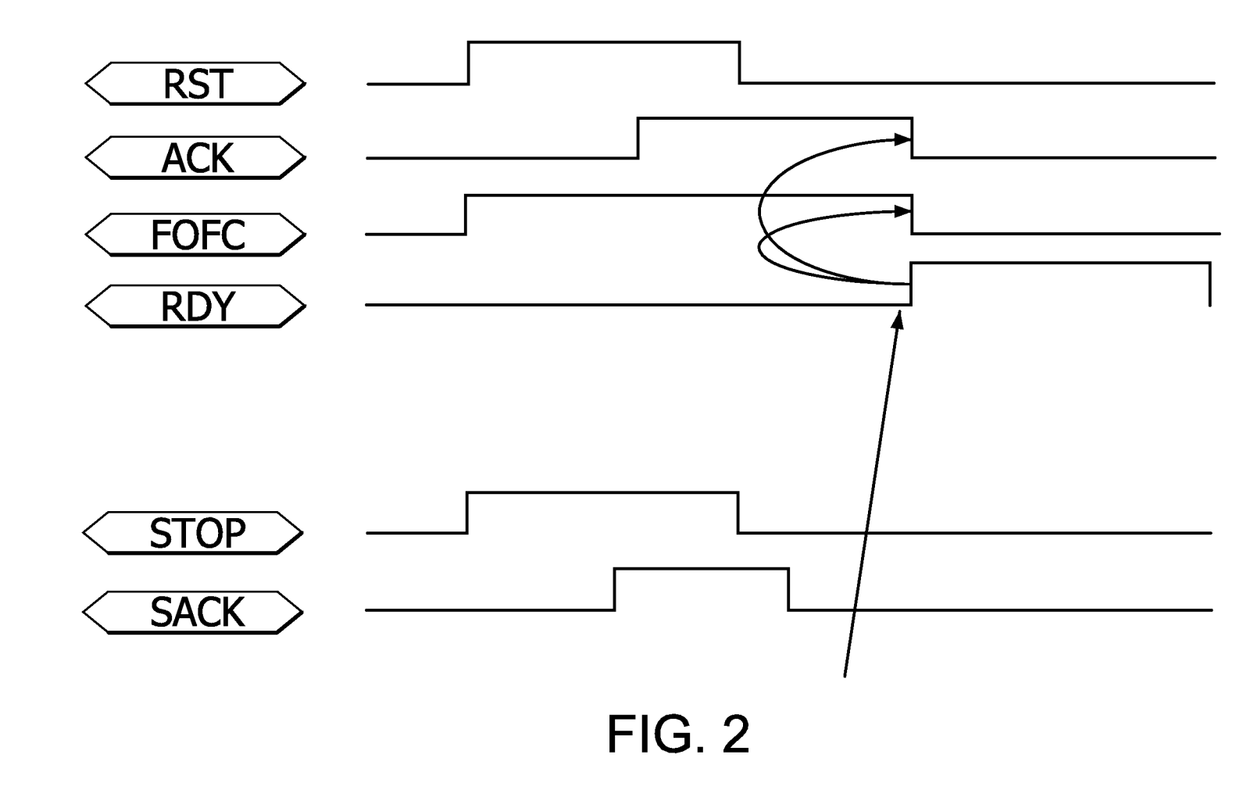
FIG. 2 illustrates a control signal sequence in accordance with one embodiment of the present invention.

The diagram in FIG. 2 shows the signal sequencing and relationships. As shown in the Figure, in one embodiment of the present invention the SCADA system clears the FOFC value and clears the ACK signal when it sets the RDY signal to 1, indicating that the turbine is ready.

SCADA Logic Flowchart

Figure 3:
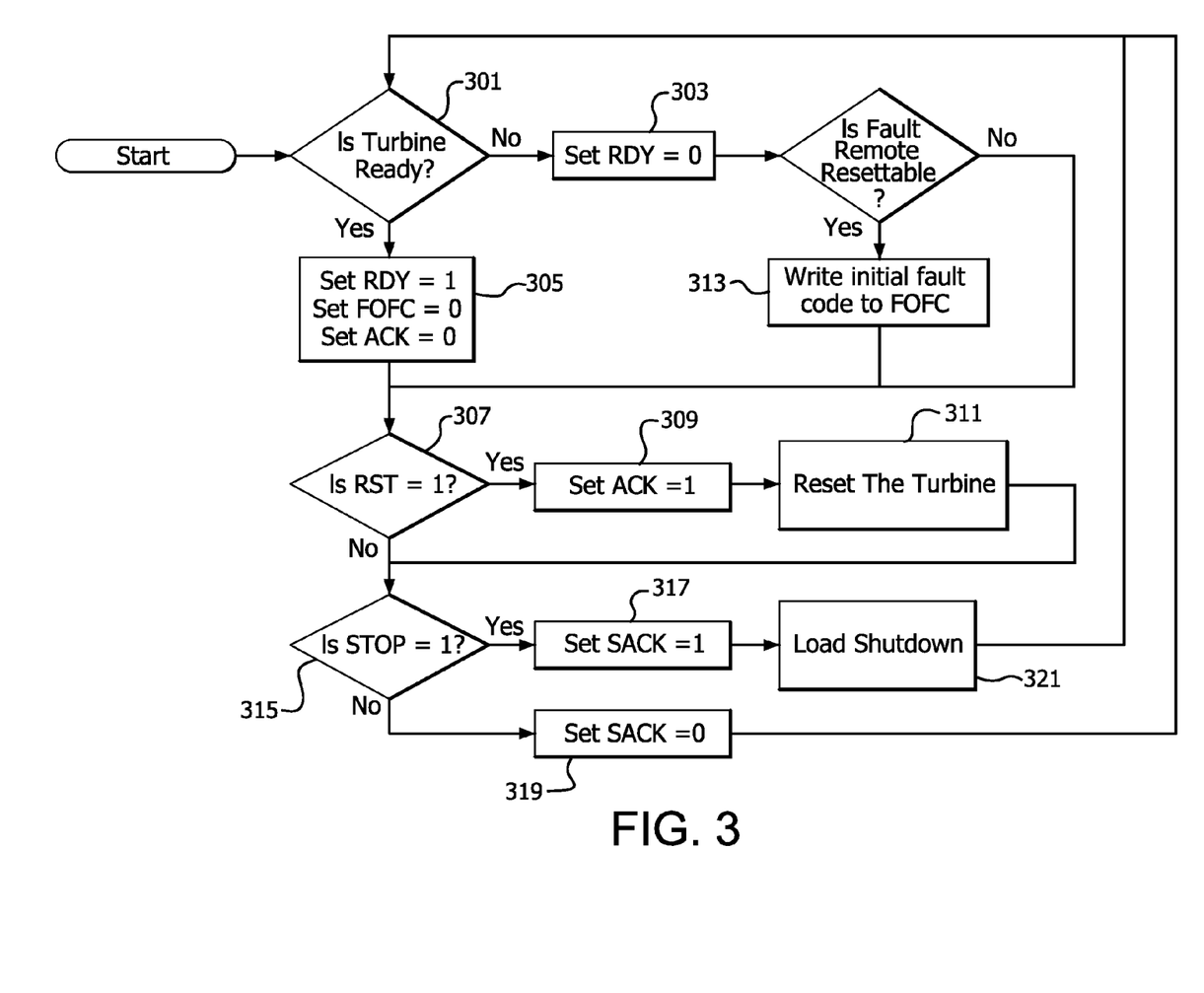
FIG. 3 illustrates flow control logic for a SCADA system in accordance with one embodiment of the present invention.

A SCADA logic flowchart is illustrated in FIG. 3 in accordance with one embodiment of the present invention. In a first step 301, the process determining whether the turbine is ready. The RDY (Ready) signal is cleared to false 303 (0) by the SCADA logic when a turbine is faulted and requires a reset. The RDY (Ready) signal is set 305 to true (1) by the SCADA logic when a turbine has been reset, comes out of a fault condition, and is ready to produce power if there is sufficient wind. When the RDY signal is set to true, the SCADA logic must also clear the ACK signal and set the FOFC value to O. The RDY is a Read Only signal to the remote application or operator. Only the SCADA logic can modify the signal.

Figure 4:
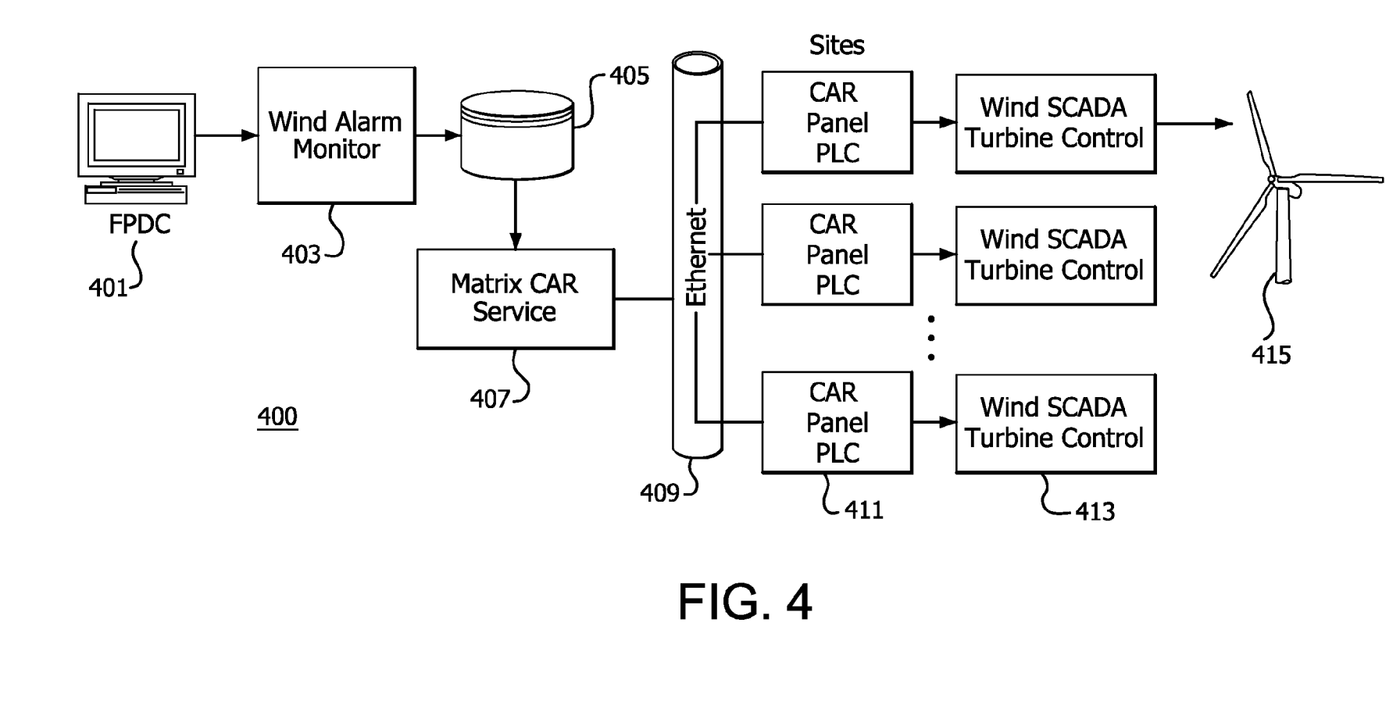
FIG. 4 illustrates a Computer Assisted Reset system in accordance with one embodiment of the present invention.

The RST or Reset signal is set 307 by the remote application used by an operator, for example application 403 (FIG. 4). Its purpose is to instruct the SCADA logic to reset the turbine. The RST signal will be cleared to false (0) by the remote application after it receives the ACK signal or after a timeout period where the ACK signal was not set to true. The latter condition would indicate a possible failure in communications or SCADA driver failure. The RST is a Read-Write signal to the remote application or operator. Only the remote application can modify the signal.

The ACK or Acknowledge signal is set 309 by the SCADA logic in response to an RST signal. An ACK signal must be set to true (1) by the SCADA logic when it receives the RST. The acknowledge informs the remote application/operator that the SCADA logic accepted the command and is in the process of resetting the turbine 311. The ACK is a Read Only signal to the remote application or operator. Only the SCADA logic can modify the signal.

The FOFC or First Occurrence Fault Code signal is set by the SCADA logic when a turbine encounters a fault condition that requires a manual remote reset. The FOFC is an analog fault code value that specifies the initial fault code causing the trip or reset-able event. The FOFC is cleared 305 when a turbine returns to a ready state and is ready to produce power. The FOFC is a Read Only signal to the remote application or operator. Only the SCADA logic can modify the signal 313.

The STOP signal is set 315 by the remote application used by an operator. Its purpose is to instruct the SCADA logic to shut down the load and stop generating power. The STOP signal will be cleared to false (0) by the remote application after it receives the SACK signal or after a timeout period where the SACK signal was not set to true 317. The latter condition would indicate a possible failure in communications or SCADA driver failure. After receiving the SACK, the remote application will clear (0) the STOP signal. The STOP is a Read-Write signal to the remote application or operator. Only the remote application can modify the signal.

The SACK or Acknowledge signal is set by the SCADA logic in response to a STOP signal. An SACK signal must be set 317 to true (1) by the SCADA logic when it receives the STOP. The acknowledge informs the remote application/operator that the SCADA logic accepted the command and is in the process of shutting down the turbine 321. The SACK is cleared 319 (0) when the STOP signal is cleared (0) by the remote application/operator. The SACK is a Read Only signal to the remote application or operator. Only the SCADA logic can modify the signal.

Computer Assisted Reset (CAR)

Figure 5:
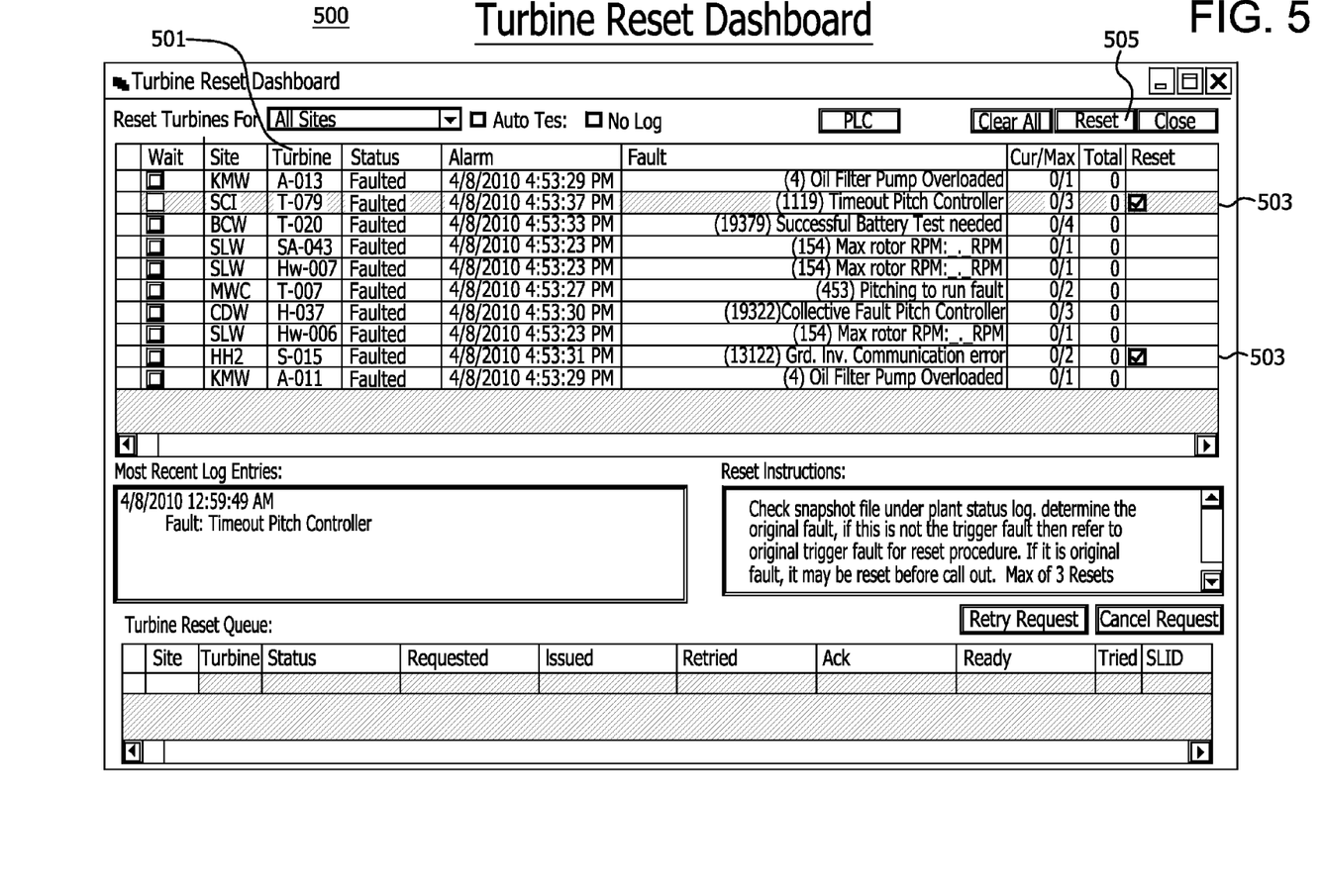
FIG. 5 illustrates a turbine reset dashboard in accordance with one embodiment of the present invention.

FIG. 4 illustrates the CAR system 400 in accordance with one embodiment of the present invention. FPDC operators 401 have the ability to remotely reset wind turbines that have faulted at selected sites directly from the Wind Alarm Monitor 403 through a single centralized dashboard (FIG. 5). The Turbine Alarm Monitor is a software application that sends turbine reset commands. This increases the efficiency and productivity of the FPDC by minimizing the time spent in logging into individual site SCADA servers, navigating different menus, and issuing individual commands to reset turbines 415. The system includes a PLC 411 located at each wind site that directly interfaces to the wind turbine controllers 413 for start, stop, and reset operations. The host side of the PLC interfaces to a CAR software service running on a Matrix server 407 that interfaces directly with the Wind Alarm Monitor 403 used by the FPDC. The system 400 also includes a wind turbine status database 405 for storing the statuses of the various wind turbines.

The CAR Panel 411 may include a Modicon PLC that serves 2 functions. The PLC monitors the status of the turbines 415 and the site by polling the SCADA system 413 and normalizes this information to the Turbine Alarm Monitor 403 in the FPDC. The PLC receives turbine reset commands from the Turbines Alarm Monitor 403 in the FPDC 401, translates the commands to the various types of wind turbine manufacturers, and issues the resets to the faulted turbines via the existing SCADA servers.

Modbus to OPC Translator

The MOT program permits the implementation of a system where a PLC located at each wind turbine control site can accept control messages or commands organized or formatted in accordance with the Modbus protocol and sent over an Internet Protocol connection, with the MOT receiving the requests through the PLC and generating an appropriate OPC ("OLE Process Control") request. The OPC request is then passed onto the respective OPC server (not illustrated in FIG. 4) residing in the SCADA system 413 for each wind turbine control site. In one embodiment of the invention, the MOT program and the OPC server may be part of the SCADA 413 illustrated in FIG. 4.

This invention provides a common central system that will reset faulted wind generator turbines. The decision when to issue reset commands will be based upon a protocol developed by FPDC operators, for example, in accordance with the specific application parameters. This goal is to provide a homogenous method of issuing the turbine resets across all of the various SCADA systems.

One advantage of using Modbus over IP is that it is easily supported by small, inexpensive PLCs (programmable logic controllers) which do not require virus protection or operating system updates. Because of the industrial nature of PLCs and the IEC 61131 standardization of the programming, these PLCs can be maintained at a fraction of the cost of using PCs, which are required to support OPC. Therefore, in wind farms that use turbines from multiple manufacturers, it makes sense to use Modbus as the homogenous data protocol for the advanced software application to use for the turbine resets.

Until such time as all wind turbine manufacturers support a Modbus Slave function, there is a need for a program, or translator, that accepts Modbus over IP requests from a remote location, via a PLC at each site, and that generates the appropriate OPC request into SCADA systems using an OPC interface.

In accordance with one embodiment of the present invention, the Modbus to OPC Translator (MOT) accepts Modbus requests over TCP/IP for all of the Modbus data types and register types. A defined table within MOT maps the Modbus request type and address to an OPC Server and Tag. The data type from the Modbus request is converted to and from the data type required by the OPC tag.

Modbus addresses do not have to fill a sequential Modbus addressing space, but the Modbus interface allows for multiple register Modbus transactions. The OPC client side bundles these multiple register requests into an OPC group and transact it as a single request to minimize network traffic. As these requests are continual and repetitive, any such OPC groups will be maintained once created.

The MOT program of the present invention may reside on any computer local to the OPC server (not necessarily on the same computer as the OPC server), so a 100 mb or better Ethernet connectivity is preferred. The MOT program maintains a status check on the connectivity to the OPC server via a selectable tag that is constantly polled, and concurrently maintains a Modbus register to report that status. Each time the connectivity with the OPC server is confirmed, the Modbus status is incremented by modulo 1000. Upon loss of connectivity with the OPC server, the MOT program is continually attempting to reconnect until the connection is reestablished.

The MOT program allows for either (i) polled or (ii) read-on-demand inputs of OPC data that the FDPC computer, via the PLC, reads from the OPC server via the MOT program. The polling rate is configurable in seconds. In the case where data is polled by the MOT program and a read request comes in, the MOT program immediately returns the latest value. If the data is read-on-demand, then when a read request arrives from the Modbus master, the MOT program initiates the read from the OPC server and does not reply to the Modbus request until the data has been retrieved from the OPC server.

Reads from the Modbus master that arrive while communications with the OPC server is down will return the Slave Device Failure error.

Reads or writes from the Modbus master that reference Modbus addresses not defined with corresponding OPC addresses (except any MOT health tags) returns an Illegal Address error.

Writes from the Modbus master that arrive while communication with the OPC server is down will be retried for a configurable number of seconds and, if communication has not been reestablished, will be cleared from the Modbus register and ignored. These writes are not allowed to succeed after the timeout period.

The MOT program can be configured via a text file import. It also permits configuration of the OPC tags via a browse list of available servers and tags.

The MOT program follows current Modbus over IP standards, including the ability to process overlapped Modbus requests. It also accepts data requests in the byte order that may be generated, for example, by a Modicon TSX Momentum PLC acting as a Modbus master.

Standard Modbus Error Handling

The MOT program provides standard Modbus slave error handling, as follows: When a master device sends a query to a slave device it expects a normal response. One of four possible events can occur from the master's query: (a) the slave device receives the query without a communication error, handles the query normally, and returns a normal response; (b) the slave does not receive the query due to a communication error, no response is returned, and the master program will eventually process a time-out condition for the query; (c) the slave receives the query but detects a communication error (parity, LRC or CRC), no response is returned, and the master program will eventually process a time-out condition for the query; (d) the slave receives the query without a communication error but cannot handle it (i.e., request is to a nonexistent coil or register), and the slave will return with an exception response informing the master of the nature of the error (Illegal Data Address.) The exception response message may include two fields that differentiate it from a normal response. In a normal response, the slave echoes the function code of the original query in the function code field of the response. All function codes may have a most-significant bit (MSB) of 0 (i.e., their values are below 80 hex). In an exception response, the slave sets the MSB of the function code to 1, making the function code value in an exception response exactly 80 hex higher than the value would be for a normal response. With the function code's MSB set, the master's application program can recognize the exception response and can examine the data field for the exception code. Additionally, in a normal response, the slave may return data or statistics in the data field. In an exception response, however, the slave returns an exception code in the data field. This code defines the slave condition that caused the exception. Exemplary exception codes are set forth in the following table:

| Exception Code | Definition | Description |
| --- | --- | --- |
| 01 | Illegal Function | The message received is not an allowable action for the addressed device. |
| 02 | Illegal Data Address | The address referenced in the function-dependent data section of the message is not valid in the addressed device. |
| 03 | Illegal Data Value | The value referenced at the addressed device location is not within range. |
| 04 | Slave Device Failure | The addressed device has not been able to process a valid message due to a bad device state. |
| 06 | Slave Device Busy | The addressed device has ejected a message due to a busy state. Retry later. |
| 07 | NAK, Negative Acknowledge | The addressed device cannot process the current message. Issue a PROGRAM POLL to obtain device-dependent error data. |
| 09 | Buffer Overflow | The data to be returned for the requested number of registers is greater than the available buffer space. Function Code 20 only. |

The following sections detail the design specifications and considerations that may be used when implementing the MOT program. One purpose of the MOT is to translate MODBUS requests into OPC requests. MOT acts as both a MODBUS slave device, and as an OPC client. MOT keeps an internal table mapping MODBUS register addresses to OPC Item IDs on specific OPC Servers. Data written from a MODBUS master to MOT is translated and written to an OPC Server. Data read from an OPC server is translated and provided to a MODBUS client on demand.

MOT may be configured via a GUI interface. MOT also supports the ability to load a configuration from a text file. The primary information that is configured is the Address Table which identifies supported MODBUS addresses and their corresponding OPC servers and item IDs. The Address Table includes a list of memory blocks, each of which represents a contiguous set of MODBUS registers. In one embodiment, each memory block may have the following parameters.

| Block Parameter | Description |
| --- | --- |
| Address Range | The range of MODBUS addresses that this memory block covers. |
| OPC Server | The ProgID of the OPC server that this memory block will communicate with. This may also include a machine name for remote OPC server connection. |
| Update Type | Demand or Polled. Demand may mean that MOT will read the data from the OPC server only to fulfill a MODBUS request. Polled may mean that MOT will poll the OPC data on a regular basis and keep a local cache of the data for fulfilling read requests. |
| Update Rate | Rate at which to read the OPC data, in seconds. Used for Polled data only. |

Additionally, in one embodiment each memory block contains information of the OPC item IDs that map to the particular registers each entry in this list will contain:

| Address Parameter | Description |
| --- | --- |
| Item ID | The OPC item ID that will be used for this point. |
| OPC Data Type | The data type of the point in OPC. |
| MODBUS Address | The address that this item corresponds to. This will be the starting address. One or more registers may be required depending on the MODBUS data type (below). |
| MODBUS Data Type | The data type of the item in MODBUS. This determines how many registers will be used to store the data. |
| Heartbeat Flag | This is a special flag that marks this as a heartbeat item. A heartbeat item is a read-only point that does not transmit the OPC value to MODBUS. Instead, it holds a counter that increments each time the OPC value is read. A heartbeat flag can only be used on a Polled address. |

MOT acts as a MODBUS TCP slave device. It listens for incoming connection requests using standard MODBUS/TCP practices and parameters. The unit identifier parameter may be ignored. The following MODBUS commands are supported:

Ox03—Read Holding Registers
Ox 1 0—Write Multiple Registers
OxO 1—Read Coils
OxOF—Write Multiple Coils In one embodiment of the present invention, all MODBUS addresses are holding registers (4x) or coils (Ox) and all MODBUS requests are for a single memory block. That is, in one embodiment of the present invention a single request cannot go past the boundaries of a memory block, or overlap another memory block.

In one embodiment of the present invention MOT also acts as an OPC client program. It supports OPC Data Access versions 1.0 and 2.0, for example. MOT may use only synchronous I/O for OPC reads and writes in one embodiment. On startup, MOT attempts to create a connection to all required OPC servers, and then create the groups and items needed, as determined by the configured memory blocks. If MOT fails to connect to a server, or if a connection to a server fails, MOT returns an error for any MODBUS requests to that server. In one embodiment of the present invention, MOT will continue to retry connecting to any disconnected servers indefinitely.

On startup, MOT opens listener sockets for MODBUS connections, and attempts to connect to all OPC servers as described above. During normal operation, MOT will accept incoming MODBUS requests and try to match them to an existing memory block. For a read request, MOT may either return the cached data (for polled blocks), or read the OPC group (for demand groups). It will then convert the OPC data and build and send a MODBUS response. And for a write request, MOT may convert the data as needed and write it to the OPC server.

When the write is complete, MOT will build and send a MODBUS response message.

In one embodiment of the invention, MOT returns the following MODBUS error codes:

| Error Name | Code | Sent If . . . |
| --- | --- | --- |
| Illegal Data Address | 0x02 | A request is received for an address not in the configuration, or which is not contained in a single memory block. |
| Illegal Data Value | 0x03 | A value is received which cannot be converted into the final data type. |
| Slave Device Failure | 0x04 | Communications with the specified OPC server are lost. |

FIG. 5 illustrates a turbine reset dashboard 500 in accordance with one embodiment of the present invention. The Turbine Reset Dashboard Window dynamically lists all turbine faults 501 across all sites in real time. A check box to reset a turbine is provided for those sites that have a CAR panel installed. The operator can select 503 one or several faulted turbines to be reset and click one button 505 issue all the commands at once. In addition to issuing the reset command, the Wind Alarm Monitor may create an automated log entry into the Wind Unit Status database with the associated fault information, time, date, and SLID values. The background services that communicate to the CAR panels may also track WAM alarm, reset, acknowledge, retry, and turbine online timestamps for additional auditing.

The foregoing description of possible implementations consistent with the present invention does not represent a comprehensive list of all such implementations or all variations of the implementations described. The description of only some implementation should not be construed as an intent to exclude other implementations. For example, artisans will understand how to implement the invention in many other ways, using equivalents and alternatives that do not depart from the scope of the invention. Moreover, unless indicated to the contrary in the preceding description, none of the components described in the implementations are essential to the invention.

What is claimed is:

1. A system for resetting turbines comprising:
a plurality of turbines;
a remote alarm monitor system for issuing Modbus requests to control all or a subset of the plurality of turbines at once; and
a plurality of PLCs corresponding to the plurality of turbines, each PLC configured to receive Modbus requests and process the requests in accordance with a type of turbine associated with that PLC;
wherein said plurality of PLCs monitor the status of said plurality of turbines and provides status information to said remote alarm monitor system;
wherein said plurality of PLCs poll a wind site SCADA system associated with the plurality of turbines to determine status information; and
wherein said wind site SCADA system associated with the plurality of turbines comprises an OPC server and a module for receiving Modbus turbine control requests processed by PLCs and translating these requests into OPC control requests.

2. The system of claim 1, wherein the turbine control requests comprise reset, start, or stop commands.

3. The system of claim 1, wherein said turbines are wind turbines.

4. The system of claim 1, wherein the remote alarm monitor system comprises a database for storing status of the plurality of turbines.

5. The system of claim 1, wherein said module for receiving Modbus turbine control requests and translating the requests into OPC control requests comprises a table to map a Modbus request type and address to an OPC server and tag.

6. The system of claim 1, wherein said module for receiving Modbus turbine control requests and translating the requests into OPC control requests maintains a status check on the connectivity to the OPC server via a selectable tag that is polled and maintains a Modbus register to report that status.

7. The system of claim 1, wherein said module for receiving Modbus turbine control requests and translating the requests into OPC control requests functions as a Modbus TCP slave device.

8. The system of claim 1, wherein said module for receiving Modbus turbine control requests and translating the requests into OPC control requests functions as an OPC client program.

9. The system of claim 1, wherein the remote alarm monitor system comprises:
a computing device configured to display in real-time status information corresponding to the plurality of turbines.

10. The system of claim 1, wherein said status information comprises fault information.

11. The system of claim 1, wherein the remote alarm monitor system comprises:
a computing device configured to allow an operator to select one or several faulted turbines to be reset.

12. The system of claim 11, wherein the computing device is also configured to allow a user to issue all commands to reset turbines at once.

13. A system for resetting turbines comprising:
a plurality of turbines;
a remote alarm monitor system for issuing Modbus requests to control all or a subset of the plurality of turbines at once, the remote alarm monitor system including a computing device, the requests including at least one of a reset, start, or stop command issueable to one or several turbines;
a plurality of PLCs corresponding to the plurality of turbines, each PLC configured to receive Modbus requests and process the requests in accordance with a type of turbine associated with that PLC; and
a wind site SCADA system corresponding to the plurality of turbines, the SCADA system comprising an OPC server and a module for receiving Modbus turbine control requests processed by PLCs and translating these requests into OPC control requests;
wherein said plurality of PLCs monitor the status of said plurality of turbines and provides status information to said remote alarm monitor system; and
wherein said plurality of PLCs poll said wind site SCADA system associated with the plurality of turbines to determine status information.

14. The system of claim 13, wherein the computing device is configured to display in real-time status information corresponding to the plurality of turbines.

15. The system of claim 13, wherein the computing device is configured to allow a user to issue the requests to every one of the plurality of turbines at once.

16. A system for resetting turbines comprising:
a plurality of turbines;
a remote alarm monitor system for issuing Modbus requests to control all or a subset of the plurality of turbines at once, the remote alarm monitor system including a computing device and a database for storing a status of the plurality of turbines;
a plurality of PLCs corresponding to the plurality of turbines, each PLC configured to receive Modbus requests and process the requests in accordance with a type of turbine associated with that PLC; and
a wind site SCADA system corresponding to the plurality of turbines, the SCADA system comprising an OPC server and a module for receiving Modbus turbine control requests processed by PLCs and translating these requests into OPC control requests;
wherein said plurality of PLCs monitor the status of said plurality of turbines and provides status information to said remote alarm monitor system; and
wherein said plurality of PLCs poll said wind site SCADA system associated with the plurality of turbines to determine status information.

17. The system of claim 16, wherein the turbine control requests comprise reset, start, or stop commands.

18. The system of claim 16, wherein the computing device is configured to display in real-time status information corresponding to the plurality of turbines.

\* \* \* \* \*